Glenn, Ball & Hackett,
Stump Elevator.
Nº 33,883.     Patented Dec. 10, 1861.
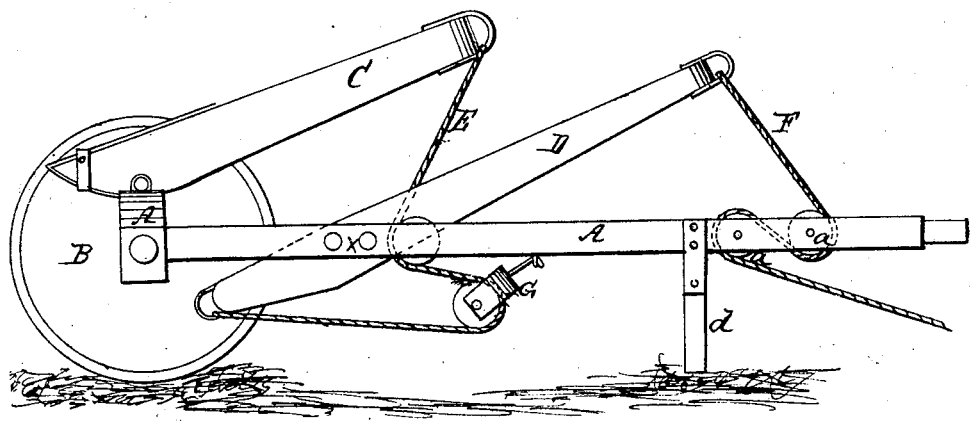
Witnesses.
A. C. Alexander
A. A. Yeatman
Inventor
C Glenn
Cortland Ball
U J Hackett

UNITED STATES PATENT OFFICE.

CHARLES J. GLENN, CORTLAND BALL, AND URIAH S. HACKETT, OF UNADILLA, MICHIGAN.

IMPROVEMENT IN STUMP-EXTRACTORS.

Specification forming part of Letters Patent No. 33,883, dated December 10, 1861.

*To all whom it may concern:*

Be it known that we, CHARLES J. GLENN, CORTLAND BALL, and URIAH S. HACKETT, of Unadilla, in the county of Livingston and State of Michigan, have invented certain new and useful Improvements in Stump-Machines; and we do hereby declare that the following is a full, clear, and exact description of the same, reference being had to the accompanying drawing, and to the letters of reference marked thereon.

In the annexed drawing, making part of this specification, A represents a frame provided with an axle upon which are two wheels B.

C is a lever which has its fulcrum on the frame over the axle. The long end of this lever extends forward and is connected by a cord E to the short end of a lever D, the cord E passing through a pulley-block G, as is shown in the drawing. The lever D has its fulcrum in the frame A at $x$. A cord F attaches to the forward and long end of lever D and passes around two pulleys $a\ a$ in the frame. When power is applied to the cord F, the lever D operates upon lever C through cord E and draws it down. A chain or other convenient attachment connects the short arm of lever C with the stump at the rear of the machine, and when the front end of lever C is drawn down great power is applied to the stump. The lever C can be raised and the chain tightened, so that the stump may be moved by degrees until it is removed from the earth.

$d$ is a support for the forward end of the frame.

Having thus fully described our invention, what we claim as new, and desire to secure by Letters Patent, is—

The employment of the levers C and D, the cords E and F, the block G, and the pulleys $a\ a\ a$, constructed and arranged for extracting grubs and stumps, substantially as herein specified.

CHARLES J. GLENN.
CORTLAND BALL.
URIAH S. HACKETT.

Witnesses:
 WM. J. MAY,
 G. S. MAY.